United States Patent Office 3,390,861
Patented July 2, 1968

3,390,861
WEDGE TYPE BALL VALVE WITH SEPARATE ACTUATORS
Henry Masheder, London, England, assignor to Lincoln Valves Limited, Kendall, Westmoreland, England, a British company
Continuation of application Ser. No. 319,016, Oct. 25, 1963. This application Apr. 11, 1966, Ser. No. 549,092
5 Claims. (Cl. 251—161)

This is a continuation of application Ser. No. 319,016, filed Oct. 25, 1963, now abandoned.

The practical application of a rotary ball valve is normally limited by the material of which the valve seatings for the ball are made. The seatings are often made of materials such as elastomers for use at normal temperatures, and of Teflon (registered trademark) for use at higher temperature.

In general, in a rotary ball valve having two seatings on opposite sides of the ball, one seating forms a better seal than the other, depending on the direction of fluid flow through the valve. In some cases, self-sealing seals are used, which act in both directions. Such systems of sealing, however, cannot generally be used effectively for the isolation of a centre vent in the valve casing at high temperatures, since these conditions require metal to metal sealing.

According to the invention, a rotary ball valve comprises a casing having two ports with valve seatings around them, a ball which can be arranged so that different surfaces engage simultaneously with the two valve seatings and which has a passage through it, means for orienting the ball with respect to the ports so as to allow fluid flow from one port to the other or to prevent such flows, and means for urging different surfaces of the ball outwards in directions so that they press against the seatings, and for reducing such pressure against the seatings.

Preferably the ball is resilient, and is assembled into the valve casing in a state of initial compression. The ball may be made resilient by providing one or more slots or grooves or both in the ball, for example, so that the ball acts as a spring. Preferably, the slots or grooves or both are disposed symmetrically around the ball.

Alternatively, the ball may be made resilient by cutting it into two parts and placing a resilient insert, of rubber for example, between the two parts.

In the preferred arrangement a spindle is used both to orient the passage through the ball with respect to the ports, and to urge different surfaces of the ball outwards against the seatings. Two separate spindles may be used, however, one to orient the ball, and one to urge the ball outwards against the seatings.

Two preferred constructions of valve will now be described with reference to FIGURES 1 and 2 of the accompanying drawings, which are sectional side elevational views of valves.

Figure 1:
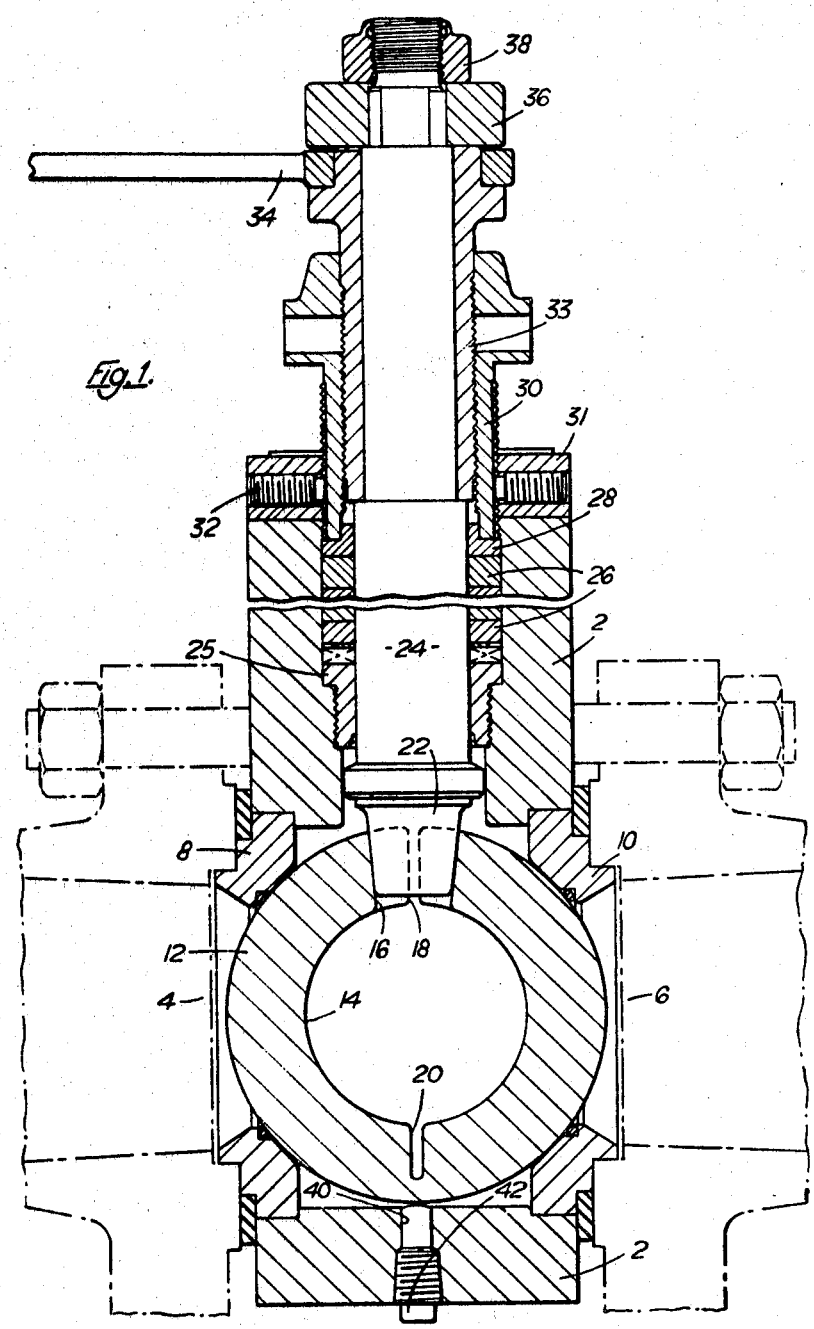

With reference to FIGURE 1:

A valve casing 2 has two ports 4 and 6, and two seatings 8 and 10 fitted respectively around these ports. A ball 12 has a passage 14 through it, and a square bore 16 having tapering sides passes through one wall of this passage 14. The slot 18 extends on either side of the bore 16, and is cut through the thickness of one wall of the passage 14 and along the whole axial length of the passage. A groove 20 extends from the passage 14 into the wall of the ball 12, and is placed diametrically opposite to the slot 18. The ball 12 is formed from stainless steel, and has stellited faces. It is assembled within the valve casing 2 in a state of initial compression. Other materials may equally well be used for the ball, depending on the particular requirements of the valve.

The square tapered end 22 of an operating spindle 24 fits into the bore 16 in the ball 12. The axial slot 18 causes the ball to act as a circular spring, and axial movement of the spindle 24 towards or away from the ball causes different surfaces of the ball to be pressed against the seatings 8 and 10 or such pressure against the seatings to be reduced, respectively.

The spindle 24 is arranged perpendicular to the passage 14 through the ball 12. The axis of the spindle passes through the centre of the ball. The main length of the spindle 24 is cylindrical. Part of its length is contained within a packing seat 25, packing 26 and a thrust ring 28, these being tightened down by means of a gland head 30 which is threaded externally to engage with a gland flange 31 which is bolted to the top of the casing 2, and internally to engage with external threading on a locking sleeve 33, both the internal and the external threads having the same pitch. The gland head is then locked in position by grub screws within threaded bores 32. The remainder of the spindle 24 is held within the locking sleeve 33 which screws into the gland head 30 as mentioned above. The top of the spindle 24 is connected to a control lever 36 which is held in place by a lock nut 38. After the orientation of the ball has been determined by means of the lever 36 when the ball is in a contracted state, different surfaces of the ball are urged outwards against the seatings 8 and 10 by tightening the locking sleeve 33 into the gland head 30, using the lever 34.

Since the internal and external threads on the gland head 30 have the same pitch, the packing 26 may be tightened down against the packing seat 25 by screwing the gland head 30 down between the threads on the locking sleeve 33 and the gland flange 31, without altering the position of the locking sleeve 33 relative to the gland flange 31 and the valve casing 2. This concentric arrangement allows the valve to be made more compact than an arrangement in which the components for tightening the packing are separate and axially spaced from the components for screwing the spindle towards the ball. Such an axially spaced arrangement may be more suitable in certain circumstances, however, depending on the type of packing used, for example.

The bottom of the casing 2 has a drainage hole or centre vent 40, which is normally filled by a plug 42.

Figure 2:
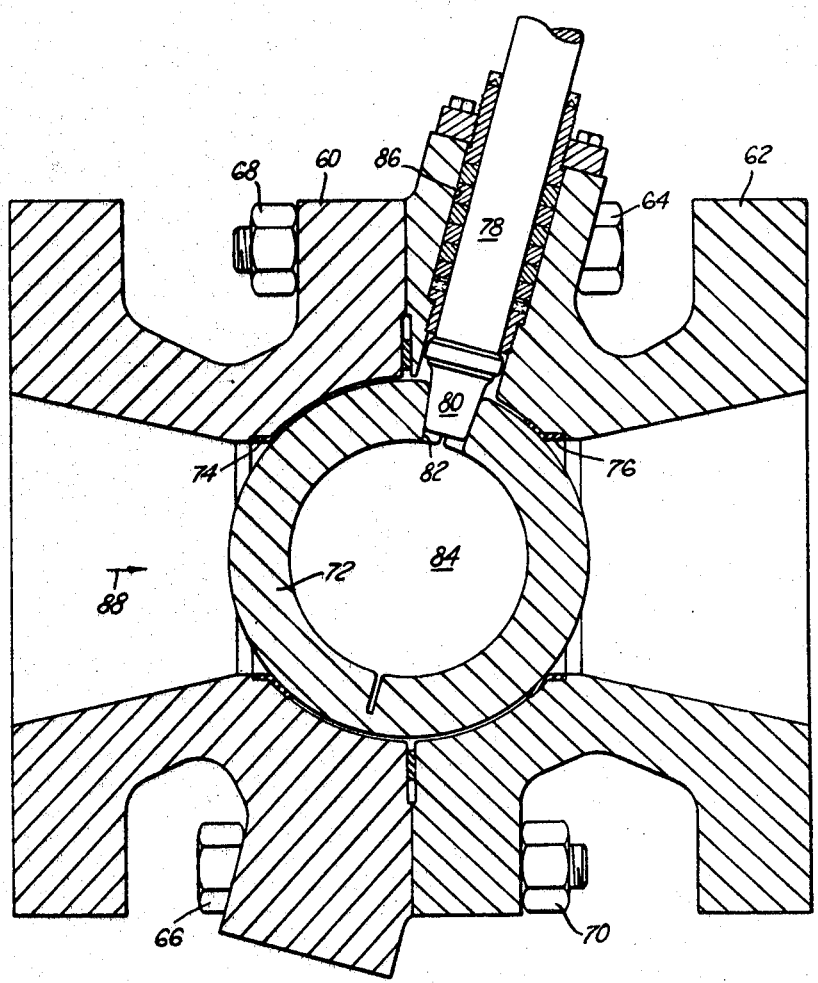

FIGURE 2 shows an alternative arrangement. The value casing is in two parts 60 and 62, which are joined together by means of bolts 64 and 66 with threaded nuts 68 and 70 respectively. A ball 72 is sandwiched between the two parts 60 and 62 of the valve casing, and the surface of the ball 72 engages against annular seals 74 and 76 in the casing. A spindle 78 has a square tapered end 80 which fits into a bore 82 through the wall of the ball 72. The ball 72 has a passage 84 through it.

The spindle 78 is held within a bore 86 through the part 62 of the valve casing. The axis of the spindle 78 is inclined to the direction of flow through the valve casing, indicated by the arrow 88, and is also inclined to the passage 84 through the ball 72, although the axis of the spindle 78 passes through the centre of the ball 72. In this arrangement, a larger angular displacement of the spindle 78 is required for a given increase in flow through the passage 84 through the valve, so a finer control of the fluid flow is possible. Also, the torque required to turn the spindle 78 is less than if the axis of the spindle is perpendicular to the passage 84. To turn the ball from its position at which there is maximum flow through the valve to its position at which there is no flow through the valve, and at which the passage through the bore is arranged symmetrically with respect to the seatings 74 and 76, so that equal thicknesses of the wall of the bore are presented opposite the valve seatings 74 and 76, the ball must be turned through an angle greater than 90° by an amount equal to the angle of inclination of the spindle 78 to the passage 84 through the ball 72.

It is sometimes required that the valve casing be welded onto a pipe line. In order to facilitate the removal of the ball from the casing without splitting the casing, the width of the ball between the ends of the passage through it may be made slightly less than the distance between the two seatings, although this width is still greater than the diameter of the bore through the seatings. By turning the ball so that its lesser width lies between the two seatings, the ball may then be removed through an opening in the valve casing provided for this purpose.

I claim:

1. A rotary ball valve comprising a casing having two ports, a valve seating around each port respectively, a resilient ball mounted in said casing in compressed engagement with the valve seatings, a passage through said ball, a slot extending from the outside surface of said ball through said ball to said passage, a spindle, a first actuating means for rotating said spindle, and a second actuating means for moving said spindle longitudinally, said spindle having a portion adapted to cooperate with said slot in said ball, for selectively orienting the ball with respect to said ports upon operation of said first actuating means, whereby to allow fluid flow from one port to the other through said passage or to prevent such flow, and for urging the surface of the ball outwards for increasing the engagement pressure against the valve seatings upon operation of said second actuating means.

2. A valve according to claim 1, said slot having tapered walls, and said spindle having a correspondingly tapered portion engageable with said tapered walls.

3. A valve according to claim 2, in which said tapered portion of the spindle has flat sides and a rectilinear perimeter, and in which said flat sides are engageable with said tapered walls.

4. A valve according to claim 1 in which said second actuating means comprises an externally threaded sleeve within which said spindle is mounted, and an internally threaded gland head surrounding said sleeve, there being cooperating shoulders on said spindle and said sleeve, such that rotation of said sleeve within said gland head causes longitudinal movement of said spindle.

5. A valve according to claim 4, in which said gland head is externally threaded with threads of the same pitch as said internal threads, and in which said external threads on said gland head cooperate with threads formed in fixed relation to said casing of said valve.

References Cited

UNITED STATES PATENTS

| | | | |
|---|---|---|---|
| 563,946 | 7/1896 | Wells | 251—188 |
| 1,876,300 | 9/1932 | Hubbell | 251—161 |
| 2,103,536 | 12/1937 | Inge | 251—161 |
| 2,488,932 | 11/1949 | Penick | 251—161 X |
| 3,004,551 | 10/1961 | Shafer | 251—187 X |
| 3,124,333 | 3/1964 | Sivyer | 251—161 |

CLARENCE R. GORDON, *Primary Examiner.*